United States Patent
Xiang et al.

(10) Patent No.: US 11,902,718 B2
(45) Date of Patent: Feb. 13, 2024

(54) SERVICE DATA TRANSMISSION METHOD, RELATED DEVICE, AND DIGITAL PROCESSING CHIP

(71) Applicant: HUAWEI TECHNOLOGIES CO., LTD., Shenzhen (CN)

(72) Inventors: Junling Xiang, Shenzhen (CN); Wei Su, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 17/715,315

(22) Filed: Apr. 7, 2022

(65) Prior Publication Data
US 2022/0232300 A1    Jul. 21, 2022

Related U.S. Application Data

(63) Continuation of application No. PCT/CN2020/118198, filed on Sep. 27, 2020.

(30) Foreign Application Priority Data

Oct. 15, 2019    (CN) .......................... 201910980016.6

(51) Int. Cl.
H04B 10/00 (2013.01)
H04Q 11/00 (2006.01)
H04J 14/00 (2006.01)

(52) U.S. Cl.
CPC ..... H04Q 11/0003 (2013.01); H04Q 11/0066 (2013.01)

(58) Field of Classification Search
CPC .............................. H04B 10/27; H04B 10/272
See application file for complete search history.

(56) References Cited

U.S. PATENT DOCUMENTS

| | | | | |
|---|---|---|---|---|
| 2009/0161538 A1* | 6/2009 | McGuire | ............. | H04L 12/4633 370/230 |
| 2009/0208210 A1* | 8/2009 | Trojer | ................. | H04J 14/0254 398/58 |
| 2014/0355991 A1* | 12/2014 | Cameirao | .......... | H04B 10/2575 398/79 |

FOREIGN PATENT DOCUMENTS

| | | |
|---|---|---|
| CN | 1791057 A | 6/2006 |
| CN | 1984051 A | 6/2007 |
| CN | 101159495 A | 4/2008 |
| CN | 101309205 A | 11/2008 |

(Continued)

OTHER PUBLICATIONS

"Draft Recommendation ITU-T G.987.3 (ex G.xgpon.3) (new) Rev.2(AR) 10-Gigabit-capable passive optical networks (XG-PON): Transmission convergence (TC) specifications", siepon_1010_ LS225_ SG15_ incoming attaches 6987_ 3es ARtext, IEEE DRAF, IEEE-SA, Piscataway, NJ USA, vol. 802.1, Oct. 18, 2010, 151 pages.

*Primary Examiner* — Daniel G Dobson
(74) *Attorney, Agent, or Firm* — Maier & Maier, PLLC

(57) ABSTRACT

A service data transmission method, a related device, and a digital processing chip, to reduce a transmission latency of service data. The method in the embodiments includes the following steps: a first device encapsulates a channel frame in a transmission frame, where the channel frame is used to carry service data. Next, the first device sends the transmission frame to a second device. A transmission manner of the channel frame is a non-decapsulation manner between an optical transport network and an access network.

20 Claims, 12 Drawing Sheets

(56) References Cited

FOREIGN PATENT DOCUMENTS

| | | | |
|---|---|---|---|
| CN | 101729371 | A | 6/2010 |
| CN | 101047450 | B | 4/2011 |
| CN | 101267386 | B | 12/2011 |
| CN | 107205180 | A | 9/2017 |
| CN | 109981209 | A | 7/2019 |
| WO | 2010048837 | A1 | 5/2010 |
| WO | 2013007318 | A1 | 1/2013 |
| WO | 2019114544 | A1 | 6/2019 |

* cited by examiner

SERVICE DATA TRANSMISSION METHOD, RELATED DEVICE, AND DIGITAL PROCESSING CHIP

CROSS-REFERENCE TO RELATED APPLICATIONS

This application is a continuation of International Application No. PCT/CN2020/118198, filed on Sep. 27, 2020, which claims priority to Chinese Patent Application No. 201910980016.6, filed on Oct. 15, 2019. The disclosures of the aforementioned applications are hereby incorporated by reference in their entireties.

FIELD

The embodiments relate to the field of optical signal transmission, and in particular, to a service data transmission method, a related device, and a digital processing chip.

BACKGROUND

As shown in FIG. 1, as a broadband optical access technology, a passive optical network (PON) 101 is characterized by a point-to-multipoint physical topology structure. The PON 101 includes an optical line terminal (OLT) 102, an optical distribution network (ODN) 103, and a plurality of optical network units (ONUs) 104. The PON needs to be used in cooperation with an appropriate transport mechanism, to complete end-to-end transmission of a service. An optical transport network (OTN) 105 is an ultra-reliable and interoperable high-speed optical network, includes a plurality of OTN devices, and can be used as a transport network that cooperates with the PON 101.

The PON 101 and the OTN 105 are independent of each other. To implement interconnection between the PON 101 and the OTN 105, a switching device 106 is needed. The switching device 106 may be a switch or a router.

SUMMARY

Embodiments provide a service data transmission method, a related device, and a digital processing chip, to reduce a transmission latency of service data and networking costs.

According to a first aspect, an embodiment provides a service data transmission method. In a transmission process of service data in an upstream transmission direction, a first device is an ONU, and a second device is a convergence device. In a transmission process of service data in a downstream transmission direction, a first device is a convergence device, and a second device is an ONU.

The method shown in this embodiment includes: first, a first device encapsulates a channel frame in a transmission frame, where the channel frame is used to carry service data, a transmission manner of the channel frame is a non-decapsulation manner between an optical transport network and an access network, and the transmission frame includes indication information used to indicate a channel frame; and then, the first device sends the transmission frame to a second device.

In this implementation, the channel frame is transmitted between the optical transport network and the access network in the non-decapsulation manner. This effectively reduces a transmission latency of the service data between the two networks. In addition, because the channel frame does not need to be forwarded between the optical transport network and the access network by using a switching device, network construction costs are effectively reduced.

Based on the first aspect of the embodiments, in an optional implementation, before the first device encapsulates the channel frame in the transmission frame, the first device processes the channel frame to form an intermediate frame, where a byte quantity corresponding to the intermediate frame is less than or equal to a first byte quantity, and the first byte quantity is a byte quantity corresponding to a payload area of a 10-gigabit-capable passive optical network encapsulation method XGEM frame.

In this implementation, when a byte quantity corresponding to the channel frame does not match the byte quantity corresponding to the XGEM frame, the first device may process the channel frame into the intermediate frame. In addition, the byte quantity corresponding to the intermediate frame is less than or equal to the byte quantity corresponding to the XGEM frame, thereby improving a success rate of encapsulating the intermediate frame in the payload area of the XGEM frame and avoiding a packet loss in the channel frame. This effectively reduces a latency in encapsulating the channel frame in the payload area of the XGEM frame.

Based on the first aspect of the embodiments, in an optional implementation, that the first device processes the channel frame to form an intermediate frame includes: if a second byte quantity is greater than the first byte quantity, the first device divides the channel frame to form a plurality of intermediate frames, where the second byte quantity is a byte quantity corresponding to the channel frame.

In this implementation, when the second byte quantity is greater than the first byte quantity, the first device may encapsulate the intermediate frame in the payload area of the XGEM frame by dividing the channel frame to form the plurality of intermediate frames. This improves a success rate of encapsulating the channel frame in the payload area of the XGEM frame and avoids a packet loss in the channel frame.

Based on the first aspect of the embodiments, in an optional implementation, that the first device divides the channel frame to form a plurality of intermediate frames includes: the first device obtains a division parameter, where the division parameter is a quotient between the second byte quantity used as a dividend and the first byte quantity used as a divisor; and the first device evenly divides the channel frame based on the division parameter, to form the intermediate frames, where a quantity of intermediate frames is equal to the division parameter.

In this implementation, the channel frame is divided by obtaining the division parameter. This effectively ensures that a byte quantity corresponding to the intermediate frame obtained after the division can be less than or equal to the first byte quantity corresponding to the XGEM frame, improves a success rate of encapsulating the channel frame in the payload area of the XGEM frame, and avoids a packet loss in the channel frame.

Based on the first aspect of the embodiments, in an optional implementation, that the first device processes the channel frame to form an intermediate frame includes: if a second byte quantity is less than or equal to the first byte quantity, the first device combines a plurality of channel frames to form the intermediate frame, where the second byte quantity is a byte quantity corresponding to the channel frame.

In this implementation, when the second byte quantity is less than or equal to the first byte quantity, the first device may combine the plurality of channel frames to form the intermediate frame, so that a byte quantity corresponding to the obtained intermediate frame is less than or equal to the first byte quantity corresponding to the XGEM frame. This effectively improves a quantity of channel frames encapsulated in the payload area of the XGEM frame and improves utilization efficiency of the payload area of the XGEM frame.

Based on the first aspect of the embodiments, in an optional implementation, a quotient between the first byte quantity used as a dividend and the second byte quantity used as a divisor is a positive integer greater than 1.

In this implementation, when determining that the quotient between the first byte quantity and the second byte quantity used as the divisor is greater than 1, the first device may combine the plurality of channel frames to form the intermediate frame. This effectively improves bandwidth utilization of the payload area of the XGEM frame.

Based on the first aspect of the embodiments, in an optional implementation, that a first device encapsulates a channel frame in a transmission frame includes: the first device encapsulates the intermediate frame in the payload area of the XGEM frame; and the first device encapsulates the XGEM frame in the transmission frame, where the transmission frame is a 10-gigabit-capable passive optical network transmission convergence XGTC frame.

In this implementation, the byte quantity corresponding to the intermediate frame obtained by the first device matches the first byte quantity corresponding to the XGEM frame, so that the first device can directly encapsulate the intermediate frame in the payload area of the XGEM frame. This effectively improves a success rate of encapsulating the intermediate frame in the payload area of the XGEM frame, and avoids a packet loss Based on the first aspect of the embodiments, in an optional implementation, a first intermediate frame is used to carry first service data, a second intermediate frame is used to carry second service data, and that a first device encapsulates a channel frame in a transmission frame includes: the first device encapsulates a first service slice and a second service slice in the payload area of the XGEM frame in an interleaving manner, where an overhead of the XGEM frame carries the indication information, the first service slice belongs to the first intermediate frame, the second service slice belongs to the second intermediate frame, and a ratio between a quantity of bytes included in the first service slice and a quantity of bytes included in the second service slice is equal to a bandwidth ratio between the first service data and the second service data; and the first device encapsulates the XGEM frame in the transmission frame, where the transmission frame is an XGTC frame.

In this implementation, the first device encapsulates, in the XGEM frame in the interleaving manner, the first intermediate frame and the second intermediate frame that carry different service data. Therefore, a transmission latency and jitter in service data transmission can be effectively reduced, utilization of a bandwidth allocated to the first device is effectively improved, and complexity of dynamic bandwidth allocation (DBA) in a service data transmission process can be effectively reduced.

Based on the first aspect of the embodiments, in an optional implementation, that a first device encapsulates a channel frame in a transmission frame includes: if a second byte quantity is less than or equal to a first byte quantity, the first device encapsulates the channel frame in a payload area of an XGEM frame, where the second byte quantity is a byte quantity corresponding to the channel frame, and the first byte quantity is a byte quantity corresponding to the payload area of the XGEM frame; and the first device encapsulates the XGEM frame in the transmission frame, where the transmission frame is an XGTC frame. In this implementation, the first device can directly encapsulate the channel frame in the payload area of the XGEM frame. This effectively simplifies a process of matching the channel frame and the XGEM frame, thereby reducing a transmission latency.

Based on the first aspect of the embodiments, in an optional implementation, a quotient between the first byte quantity used as a dividend and the second byte quantity used as a divisor is 1.

Based on the first aspect of the embodiments, in an optional implementation, if the first device is an optical network unit ONU, before the first device encapsulates the channel frame in the transmission frame, the method further includes: the first device receives the service data; and the first device encapsulates the service data in the channel frame.

Based on the first aspect of the embodiments, in an optional implementation, if the first device is a convergence device, and the convergence device is configured to connect the optical transport network and the access network, before the first device encapsulates the channel frame in the transmission frame, the method further includes: the first device receives the channel frame from the optical transport network.

According to a second aspect, an embodiment provides a service data transmission method. The method includes: a second device receives a transmission frame from a first device, where the transmission frame includes indication information used to indicate a channel frame; and the second device obtains the channel frame carried in the transmission frame, where the channel frame is used to carry service data, and a transmission manner of the channel frame is a non-decapsulation manner between an optical transport network and an access network. For beneficial effects shown in this aspect, refer to those shown in the first aspect. Details are not described again.

Based on the second aspect of the embodiments, in an optional implementation, that the second device obtains the channel frame carried in the transmission frame includes: the second device obtains an intermediate frame carried in the transmission frame, where a byte quantity corresponding to the intermediate frame is less than or equal to a first byte quantity, and the first byte quantity is a byte quantity corresponding to a payload area of an XGEM frame; and the second device processes the intermediate frame to obtain the channel frame.

Based on the second aspect of the embodiments, in an optional implementation, that the second device obtains an intermediate frame carried in the transmission frame includes: the second device obtains the XGEM frame carried in the transmission frame, where the transmission frame is an XGTC frame, and an overhead of the XGEM frame carries the indication information; the second device obtains a first service slice and a second service slice from the XGEM frame, where the first service slice belongs to a first intermediate frame, the second service slice belongs to a second intermediate frame, the first intermediate frame is used to carry first service data, the second intermediate frame is used to carry second service data, and a ratio between a quantity of bytes included in the first service slice and a quantity of bytes included in the second service slice is equal to a bandwidth ratio between the first service data and the second service data; the second device obtains the first intermediate frame based on the first service slice; and the second device obtains the second intermediate frame based on the second service slice.

According to a third aspect, an embodiment provides a digital processing chip. The chip includes a processor and a memory, the memory and the processor are interconnected by using a line, the memory stores instructions, and the processor is configured to perform the service data transmission method according to any one of the first aspect, the second aspect, or the implementations of the first aspect or the second aspect.

According to a fourth aspect, an embodiment provides a first device, including a processor, a memory, and an optical transceiver. The processor, the memory, and the optical transceiver are interconnected by using a line. The processor invokes program code in the memory to perform the processing function performed by the first device according to any one of the first aspect, the second aspect, or the implementations of the first aspect or the second aspect. The optical transceiver is configured to perform the sending/receiving function performed by the first device according to any one of the first aspect, the second aspect, or the implementations of the first aspect or the second aspect.

According to a fifth aspect, an embodiment provides a second device, including a processor, a memory, and an optical transceiver. The processor, the memory, and the optical transceiver are interconnected by using a line. The processor invokes program code in the memory to perform the processing function performed by the second device according to any one of the first aspect, the second aspect, or the implementations of the first aspect or the second aspect. The optical transceiver is configured to perform the sending/receiving function performed by the second device according to any one of the first aspect, the second aspect, or the implementations of the first aspect or the second aspect.

According to a sixth aspect, an embodiment provides a computer-readable storage medium, including instructions. When the instructions run on a computer, the computer is enabled to perform the service data transmission method in any one of the first aspect, the second aspect, or the implementations of the first aspect or the second aspect.

According to a seventh aspect, an embodiment provides a computer program product including instructions. When the computer program product runs on a computer, the computer is enabled to perform the service data transmission method in any one of the first aspect, the second aspect, or the implementations of the first aspect or the second aspect.

DETAILED DESCRIPTION OF THE EMBODIMENTS

The solutions in the embodiments are clearly described in the following with reference to the accompanying drawings.

Figure 1:
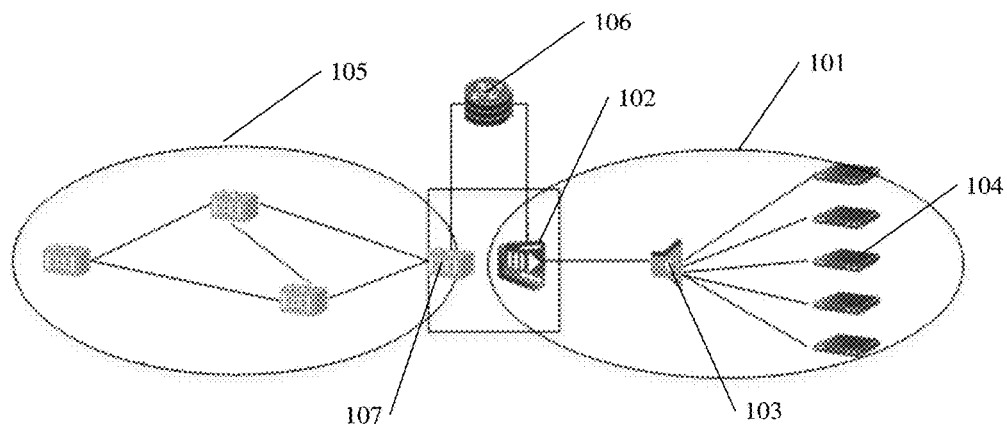
FIG. 1 is an example diagram of a networking architecture of an existing communication system.

To better understand the service data transmission method, the following describes, with reference to FIG. 1, a defect of implementing service data transmission in an existing communication system.

In a communication system shown in FIG. 1, a PON 101 and an OTN 105 are of different network types, and consequently the two networks cannot be directly connected to implement end-to-end interconnection. For example, the OTN 105 uses an OTN network type, and the PON 101 uses a 10-gigabit-capable passive optical network (10 GPON) network type. Failure to implement end-to-end interconnection indicates that service data cannot be directly exchanged between the OTN 105 and the PON 101. This causes an increase in a transmission latency of the service data.

The following describes a process of transmitting service data between communication networks that cannot implement end-to-end interconnection. A direction in which service data is transmitted from the OTN 105 to the PON 101 is defined as a downstream transmission direction, and a direction in which service data is transmitted from the PON 101 to the OTN 105 is defined as an upstream transmission direction.

For example, service data is transmitted in an upstream transmission direction. A user-side device (such as a computer, a telephone set, or a television) sends service data to an ONU 104. The ONU 104 encapsulates the service data as a gigabit-capable passive optical network (GPON) encapsulation method (GEM) frame. The ONU 104 encapsulates the GEM frame in an upstream optical burst packet. The ONU 104 sends the upstream optical burst packet to an OLT 102.

To implement end-to-end interconnection, the PON 101 and the OTN 105 need to exchange service data by using a switching device 106. An example in which the OLT 102 is connected to the switching device 106 by using an Ethernet interface is used for description. When there is a plurality of OLTs 102, the switching device 106 needs to be separately connected to different OLTs by using different Ethernet interfaces. That is, each Ethernet interface of the switching device 106 corresponds to only one unique OLT 102.

Ethernet is a local area network communication manner that is currently most widely used and is also a protocol. The Ethernet interface is a port that uses an Ethernet protocol and that is used for data connection. The Ethernet interface may be configured to receive or send a signal that uses the Ethernet protocol, such as an Ethernet frame.

When the OLT 102 receives the upstream optical burst packet from the ONU 104, the OLT 102 needs to terminate transmission of the upstream optical burst packet. The OLT 102 obtains the service data by parsing the upstream optical burst packet. The OLT 102 sends the service data to the switching device 106 by using the Ethernet interface.

An OTN device 107 receives an Ethernet frame from the switching device 106 by using an Ethernet interface. The OTN device 107 obtains the service data by parsing the Ethernet frame. The OTN device 107 sends the service data to a network server. Alternatively, the OTN device 107 sends the service data to another OTN device in the OTN 105. The network server may be the Internet, a public switched telephone network (PSTN), or the like.

Because point-to-point communication is implemented between the PON 101 and the OTN 105 by using the Ethernet interface, a relatively large quantity of transmission media are used, costs are relatively high, and a transmission latency in a service data transmission process is high. A service data transmission technology may effectively reduce a transmission latency in a service data transmission process while implementing end-to-end interconnection between a PON and an OTN. In addition, no switching device needs to be introduced between the PON and the OTN, thereby effectively reducing network construction costs.

Figure 2:
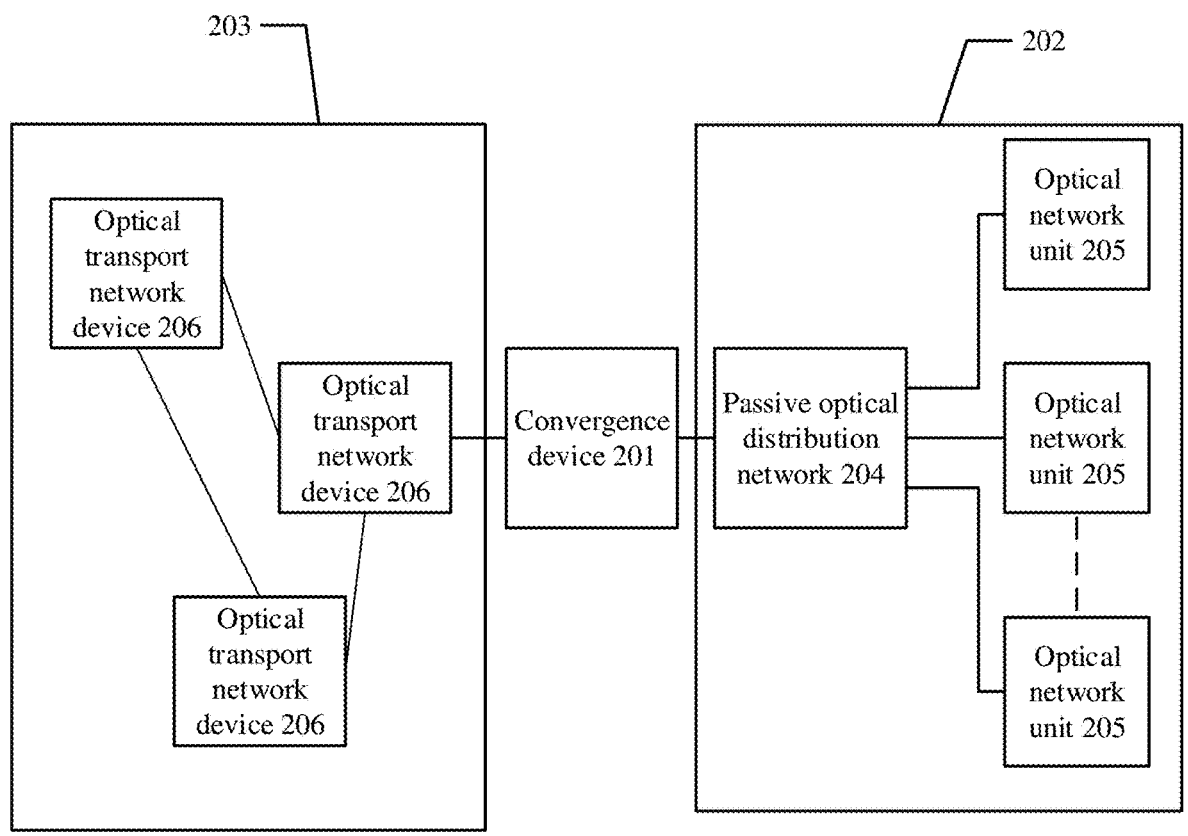
FIG. 2 is an example diagram of a networking architecture of a communication system.

The following first provides, with reference to FIG. 2, example descriptions of a networking architecture of a communication system to which a service data transmission method is applied.

As shown in FIG. 2, the communication system provided in this embodiment includes a convergence device 201. The convergence device 201 has functions of the OLT and the OTN device that are shown in FIG. 1. Because the OTN device is a device located in an optical transport network, and the OLT is a device located in an access network, it can be learned that the convergence device is configured to connect a PON 202 used as an access network and an OTN 203 used as a transport network.

The PON 202 shown in this embodiment includes an optical distribution network (ODN) 204. The ODN 204 is connected to a plurality of optical network units (ONUs) 205. The convergence device 201 shown in this embodiment has a PON interface. The convergence device 201 exchanges data with the ODN 204 based on the PON interface.

In this embodiment, for example, a network type of the PON 202 is a 10 GPON. It should be noted that a network type of the PON 202 is not limited in this embodiment. For example, the PON 202 may alternatively use a gigabit-capable passive optical network (GPON) network type. The PON 202 may alternatively use a subsequent higher-rate network type, such as a 25 G passive optical network (25 GPON), a 50 G passive optical network (50 GPON), or a 100 G passive optical network (100 GPON). Different network types of the PON 202 may use different PON interfaces described above.

The convergence device 201 shown in this embodiment further has an optical transport network (OTN) interface. The convergence device 201 exchanges data with an OTN device 206 in the OTN 203 based on the OTN interface.

Figure 3:
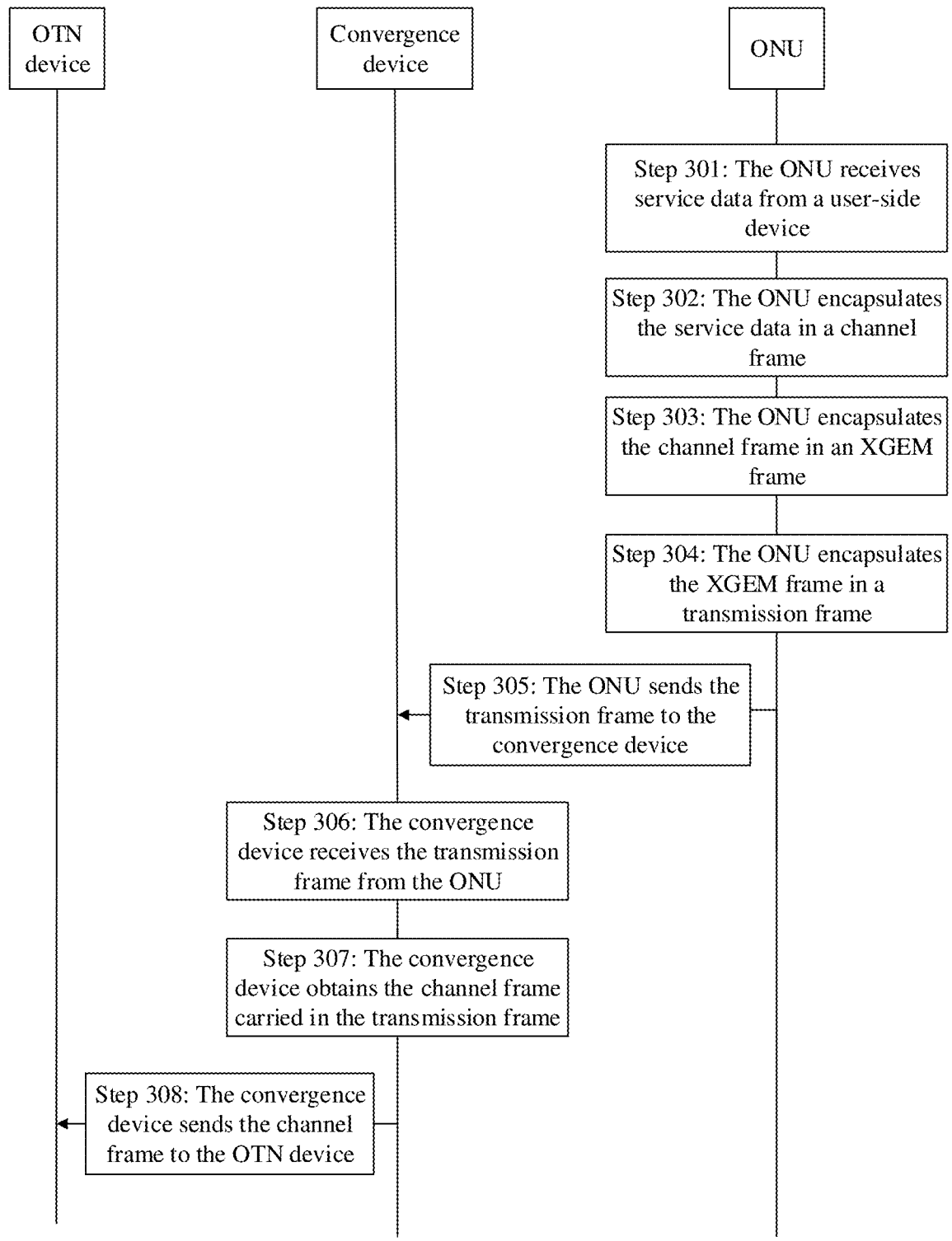
FIG. 3 is a step flowchart of an embodiment of a service data transmission method.
Figure 4:
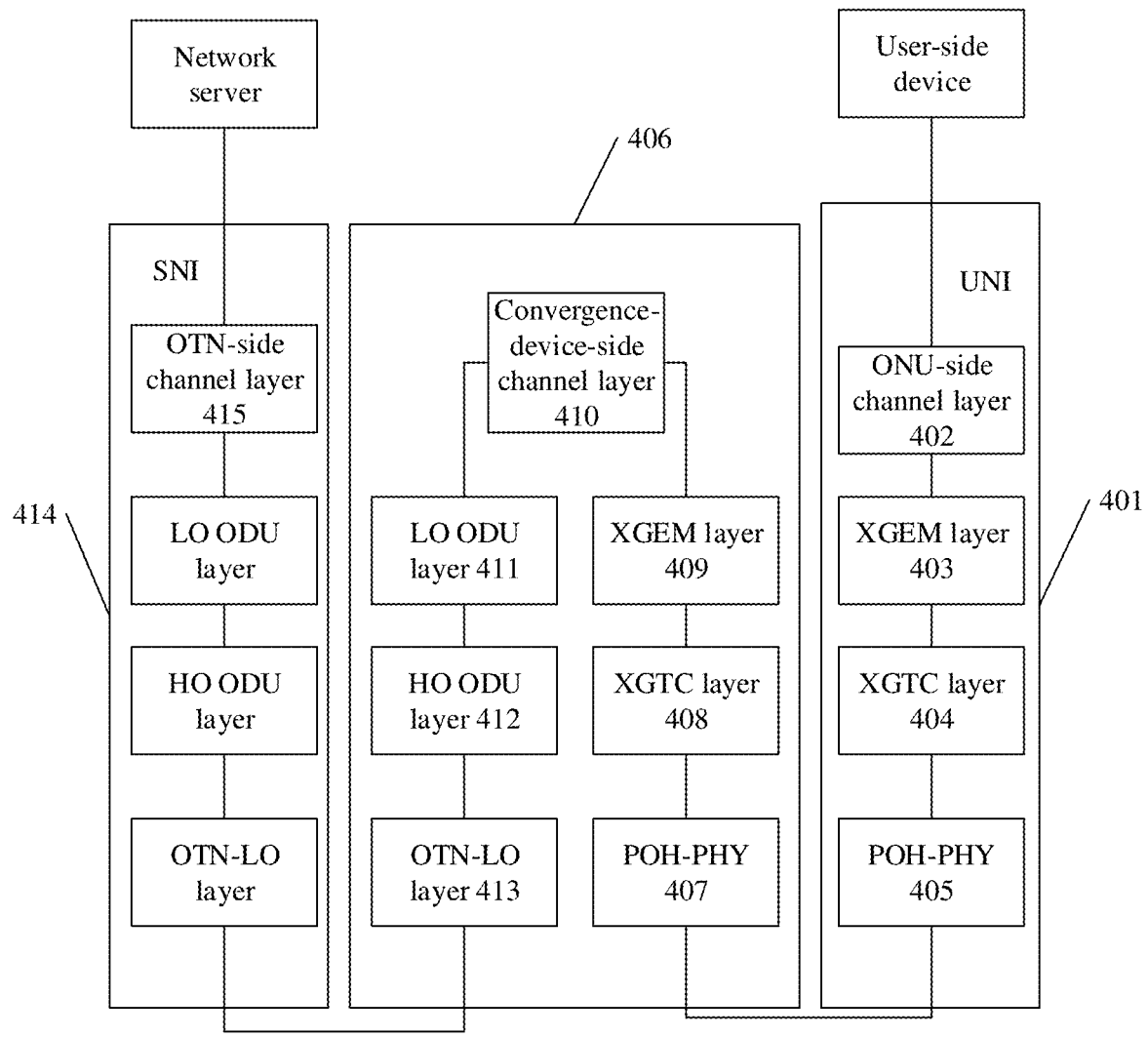
FIG. 4 is an example diagram of a protocol stack of a communication system.

The following describes, with reference to FIG. 3 and FIG. 4, an embodiment of a service data transmission method. FIG. 3 is a step flowchart of an embodiment of a service data transmission method. FIG. 4 is an example diagram of a protocol stack of a communication system. In this embodiment, an example in which service data is transmitted in an upstream transmission direction is used as for description.

Step 301: An ONU receives service data from a user-side device.

As shown in FIG. 4, an ONU 401 receives upstream service data from a user-side device by using a user network interface (UNI). A service type of the upstream service data is not limited in this embodiment. For example, the service type may be a packet service, a time division multiplexing (TDM) service, or the like.

Step 302: The ONU encapsulates the service data in a channel frame.

The ONU may preset a value of a byte quantity corresponding to the channel frame, such as 8 bytes, 16 bytes, 32 bytes, 64 bytes, 128 bytes, 192 bytes, 256 bytes, or 512 bytes.

Optionally, the ONU may reduce the value of the byte quantity corresponding to the channel frame, to reduce a latency in encapsulating the service data in the channel frame. To simplify a matching process of encapsulating the service data in the channel frame, the ONU may increase the value of the byte quantity corresponding to the channel frame.

A frame structure of the channel frame shown in this embodiment may include bytes or bits whose quantity is an integer multiple. The channel frame may include an overhead area and a payload area. The overhead area includes but is not limited to a service frame header indication, a trail trace identifier (TTI), bit interleaved parity-X (X bit-interleaved parity, BIP-X), a backward error indication (BEI), a backward defect indication (BDI), a status indication, a timestamp, a sequence identifier, a mapping overhead, a tributary port number (TPN), or the like. The payload area is used to carry the service data.

The ONU may pre-determine a value of a rate of the channel frame. For example, the rate of the channel frame is 2 megabits per second (Mbps), 10 Mbps, 100 Mbps, 200 Mbps, 500 Mbps, 1 gigabit per second (Gbps), or the like. A value of the rate of the channel frame is not limited in this embodiment, provided that the rate of the channel frame is greater than or equal to a rate of the service data.

As shown in FIG. 4, an ONU-side channel layer 402 may be added to the ONU. The ONU-side channel layer 402 is configured to: determine the byte quantity corresponding to the channel frame, and asynchronously encapsulate the service data in the channel frame. A disposition manner of the ONU-side channel layer 402 is not limited in this embodiment. For example, a printed circuit board or the like configured to implement a function of the ONU-side channel layer may be disposed in the ONU.

Step 303: The ONU encapsulates the channel frame in an XGEM frame.

The byte quantity corresponding to the channel frame is fixed, and the ONU may set a frame rate of the channel frame to carry service data with different bandwidths. A frame rate of the 10-gigabit-capable passive optical network encapsulation method (10 GPON encapsulation method, XGEM) frame is fixed, and a byte quantity corresponding to a payload area of the XGEM frame is variable. Step 303 shown in this embodiment aims to encapsulate the channel frame in the payload area of the XGEM frame. There may be two manners:

Manner 1

When the ONU determines that a second byte quantity corresponding to the channel frame does not match a first byte quantity corresponding to the payload area of the XGEM frame, the ONU may process the channel frame to form an intermediate frame. A byte quantity corresponding to the formed intermediate frame matches the first byte quantity. That a second byte quantity corresponding to the channel frame does not match a first byte quantity corresponding to the payload area of the XGEM frame may indicate that the second byte quantity is greater than the first byte quantity or indicate that the second byte quantity is less than the first byte quantity. That a byte quantity corresponding to the intermediate frame matches the first byte quantity may indicate that the byte quantity corresponding to the intermediate frame is less than or equal to the first byte quantity.

A manner of forming the intermediate frame is not limited in this embodiment. For example, the channel frame may be divided to form a plurality of intermediate frames. For another example, a plurality of channel frames may be combined to form the intermediate frame. When the ONU obtains the intermediate frame, the ONU can synchronously encapsulate the intermediate frame in the payload area of the XGEM frame.

Manner 2

If the ONU determines that a second byte quantity corresponding to the channel frame is less than or equal to a first byte quantity corresponding to the payload area of the XGEM frame, the ONU may directly synchronously encapsulate the channel frame in the XGEM frame.

As shown in FIG. 4, the ONU-side channel layer 402 is disposed on an XGEM layer 403. The XGEM layer 403 may perform the foregoing process of encapsulating the channel frame in the XGEM frame.

Step 304: The ONU encapsulates the XGEM frame in a transmission frame.

The transmission frame shown in this embodiment may be a 10-gigabit-capable passive optical network transmission convergence (XGPON transmission convergence, XGTC) frame. The ONU may encapsulate the XGEM frame in a payload area of the XGTC frame. Indication information is set in an overhead of the XGEM frame shown in this embodiment. It can be learned that the indication information is used to indicate that data carried in the payload area of the XGEM frame is the channel frame.

As shown in FIG. 4, the XGEM layer 403 is disposed on an XGTC layer 404. The XGTC layer 404 is configured to encapsulate the XGEM frame in the XGTC frame.

Step 305: The ONU sends the transmission frame to a convergence device.

In this embodiment, the ONU may send the transmission frame to the convergence device by using a PON interface.

As shown in FIG. 4, the XGTC layer 404 is disposed on a passive optical network physical layer (PON-PHY) 405. The PON-PHY 405 is configured to send the transmission frame to the convergence device by using the PON interface.

Step 306: The convergence device receives the transmission frame from the ONU.

In this embodiment, the convergence device performs de-capsulation processing on the transmission frame, to obtain the XGEM frame in the payload area of the transmission frame.

As shown in FIG. 4, a PON-PHY 407 of a convergence device 406 receives the transmission frame by using the PON interface.

Step 307: The convergence device obtains the channel frame carried in the transmission frame.

First, when receiving the transmission frame, the convergence device can extract the XGEM frame from a payload area of the transmission frame.

As shown in FIG. 4, an XGTC layer 408 of the convergence device 406 is disposed on the PON-PHY 407. The XGTC layer 408 obtains the transmission frame from the PON-PHY 407, so that the XGTC layer 408 can extract the XGEM frame from the transmission frame. The XGTC layer 408 may lock a frame header of the XGEM frame based on bandwidth map information of the XGTC frame, and then extract the XGEM frame.

Next, the convergence device extracts the channel frame from the payload area of the XGEM frame. After obtaining the XGEM frame, the convergence device can obtain the indication information carried in the overhead of the XGEM frame, so that the convergence device can determine, based on this information, that the channel frame is carried in the payload area of the XGEM frame.

As shown in FIG. 4, an XGEM layer 409 of the convergence device 406 is disposed on the XGTC layer 408. The XGEM layer is configured to obtain the channel frame carried in the XGEM frame.

Step 308: The convergence device sends the channel frame to an OTN device.

In this embodiment, the convergence device determines, based on the indication information, that the data carried in the payload area of the XGEM frame is the channel frame. The convergence device determines that a transmission manner of the channel frame is a non-decapsulation manner between an optical transport network and an access network.

It can be learned from the descriptions shown in FIG. 2 that, the convergence device shown in this embodiment has a function of an OLT and a function of an OTN device. For example, as shown in FIG. 4, that the convergence device 406 has a function of an OLT indicates that the convergence device 406 has the PON-PHY 407, the XGTC layer 408, and the XGEM layer 409, and that the convergence device 406 has a function of an OTN device indicates that the convergence device 406 has an LO ODU layer 411, an HO ODU layer 412, and an OTN-LO layer 413. The LO ODU layer 411 represents a lower-order optical data unit (ODU) layer. The HO ODU layer 412 represents a higher-order ODU layer. In another example, the convergence device 406 may alternatively have only one ODU layer, and a convergence-device-side channel layer 410 is configured to encapsulate the channel frame in the ODU layer.

As shown in FIG. 4, the convergence-device-side channel layer 410 is disposed in the convergence device 406 shown in this embodiment. The convergence-device-side channel layer 410 is located on both the XGEM layer 409 and the LO ODU layer 411. The convergence device 406 may implement a function of connecting the optical transport network and the access network based on the convergence-device-side channel layer 410.

When the convergence-device-side channel layer 410 obtains the channel frame from the XGEM layer 409, the convergence-device-side channel layer 410 may directly encapsulate the channel frame in a low-order ODU of the LO ODU layer 411. The convergence-device-side channel layer 410 can send the channel frame from the access network to the optical transport network without decapsulating the channel frame.

Figure 5:
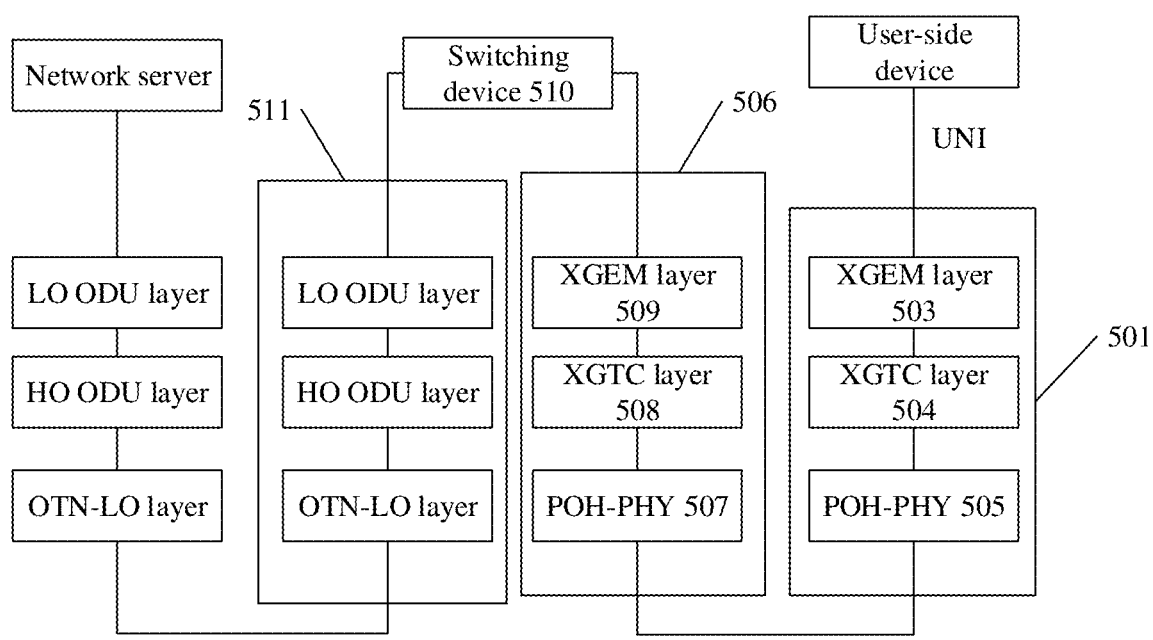
FIG. 5 is an example diagram of a protocol stack of a communication system according to an existing solution.

To better understand a difference between the method shown in this embodiment and an existing solution, the following provides comparison descriptions with reference to FIG. 4 and FIG. 5. FIG. 5 is an example diagram of a protocol stack of a communication system according to an existing solution.

As shown in FIG. 5, when an ONU 501 receives service data from a user-side device, the ONU 501 may sequentially perform processing based on an XGEM layer 503, an XGTC layer 504, and a PON-PHY 505, to send, to an OLT 506, an XGTC frame that carries the service data. As shown in FIG. 5, because no channel layer is disposed on an ONU 501 side, the XGEM layer 503 directly encapsulates the service data in an XGEM frame. For descriptions of the XGTC layer 504 and the PON-PHY 505, refer to the corresponding descriptions in FIG. 4. Details are not described again.

A PON-PHY 507 of an OLT 506 shown in FIG. 5 is configured to receive a transmission frame by using a PON interface. An XGTC layer 508 is configured to decapsulate the transmission frame to obtain the XGEM frame. An XGEM layer 509 is configured to obtain the service data by decapsulating the XGEM frame. The XGEM layer 509 is further configured to convert the service data into an Ethernet frame and send the Ethernet frame to a switching device 510. The switching device 510 forwards the Ethernet frame to an OTN device 511, so that the OTN device 511 can obtain the service data by parsing the Ethernet frame. It can be learned that based on the communication system shown in FIG. 5, decapsulation processing needs to be performed on the XGEM frame to obtain the service data, and then the service data is transmitted from an access network to an optical transport network by using an Ethernet interface.

As shown in FIG. 4, the XGEM layer 409 shown in this embodiment performs decapsulation processing on the XGEM frame to obtain the channel frame. The convergence device does not further perform decapsulation processing on the channel frame. The convergence-device-side channel layer 410 may directly encapsulate the channel frame in the LO ODU layer 411. After the HO ODU layer 412 and the OTN-LO layer 413 sequentially perform processing, an optical transport network (OTN) frame that carries the channel frame is sent to an OTN device 414.

An OTN-side channel layer 415 is disposed in the OTN device 414, and the OTN-side channel layer 415 is configured to obtain the service data by decapsulating the channel frame. The OTN-side channel layer 415 is further configured to send the service data to a network server by using a service network interface (SNI).

It can be learned that, in this embodiment, a hard pipeline for transmitting the channel frame may be created between the convergence device and the ONU, to implement end-to-end interconnection between the optical transport network and the access network. As shown in FIG. 4, the hard pipeline for transmitting the channel frame may be created between the access network and the optical transport network by using the ONU-side channel layer 402 and the convergence-device-side channel layer 410. The hard pipeline is a pipeline that can effectively ensure that transmission is not interrupted, and no packet loss occurs in a process of transmitting the channel frame. Transmission performance of the channel frame can be directly monitored by using the hard pipeline, thereby effectively reducing monitoring complexity. In a process in which the channel frame is transmitted between the access network and the optical transport network in the non-decapsulation manner, a transmission latency in transmitting the service data between the access network and the optical transport network is effectively reduced.

Figure 6:
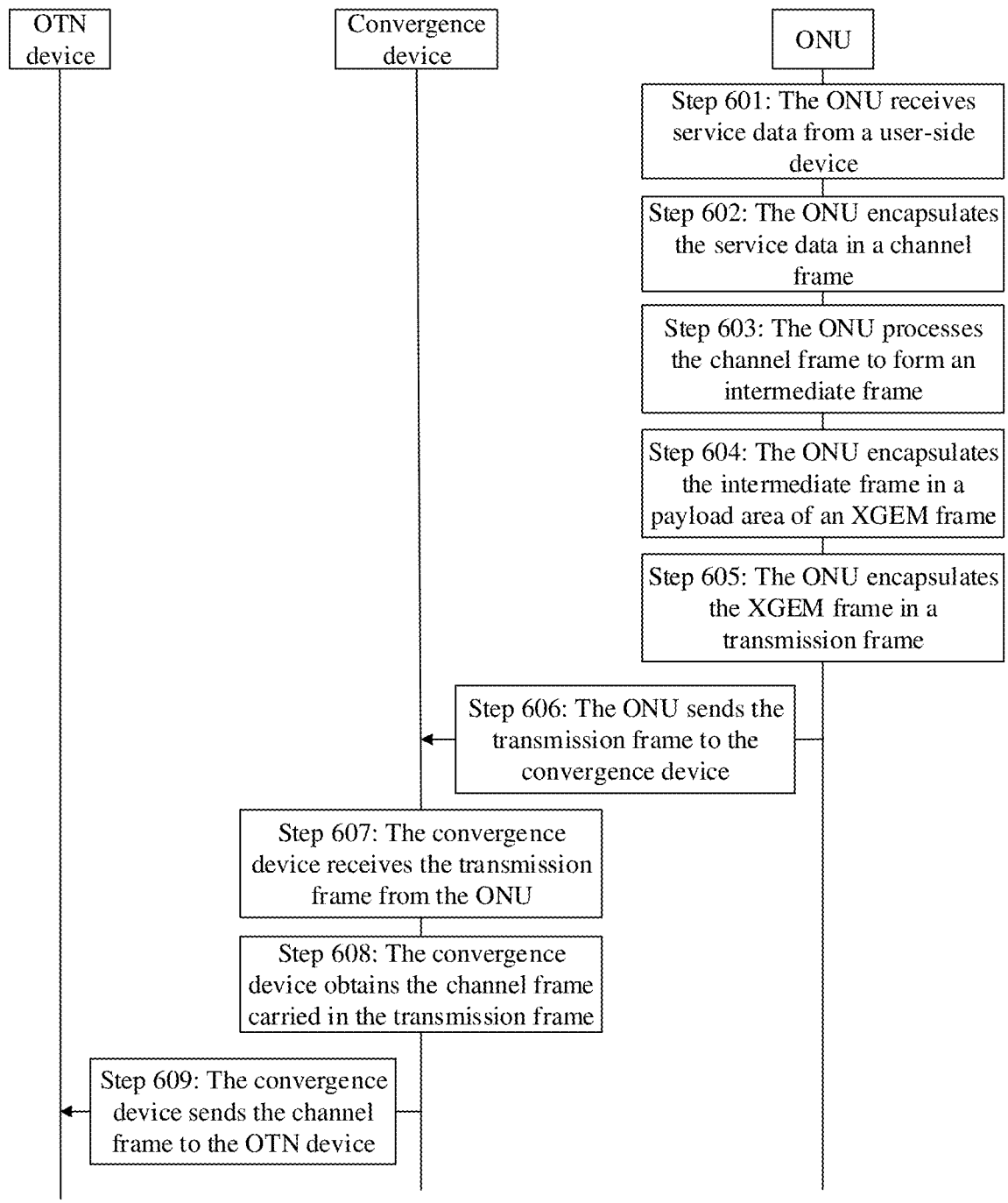
FIG. 6 is a step flowchart of another embodiment of a service data transmission method.

The following describes, with reference to FIG. 6, another embodiment of a service data transmission method. The embodiment shown in FIG. 6 describes how to process a channel frame to form an intermediate frame, and how to implement a transmission process of service data in an upstream transmission direction based on the intermediate frame.

Step 601: An ONU receives service data from a user-side device.

Step 602: The ONU encapsulates the service data in a channel frame.

For execution processes of step 601 and step 602, refer to the related descriptions of step 301 and step 302 that are shown in FIG. 3. Details are not described herein again.

Step 603: The ONU processes the channel frame to form an intermediate frame.

In this embodiment, the ONU needs to process the channel frame to form the intermediate frame, and then encapsulate, in a payload area of an XGEM frame, the intermediate frame that carries the service data. A manner of processing the channel frame is not limited in this embodiment, provided that a second byte quantity corresponding to the intermediate frame formed after the processing is less than or equal to a first byte quantity. The first byte quantity is a byte quantity corresponding to the payload area of the XGEM frames. The following describes several optional manners of forming the intermediate frame.

Manner 1

In this manner, if a second byte quantity corresponding to the channel frame is greater than the first byte quantity, the ONU may divide the channel frame to form a plurality of intermediate frames. A detailed process is as follows:

The ONU obtains a division parameter. The division parameter is a quotient between the second byte quantity used as a dividend and the first byte quantity used as a divisor.

The ONU evenly divides the channel frame based on the division parameter, to form the intermediate frames. A quantity of intermediate frames is equal to the division parameter. If the division parameter is N, in this manner, for example, the determined division parameter N is a positive integer greater than 1. The ONU may evenly divide the channel frame into N parts. Each part obtained by evenly dividing the channel frame is an intermediate frame shown in this embodiment.

In this embodiment, an example in which the channel frame is evenly divided is used for example description. In another example, the channel frame may be alternatively unevenly divided, provided that a byte quantity corresponding to each intermediate frame is less than or equal to the first byte quantity.

To better understand this manner, the following describes this manner with reference to an example.

Figure 7:
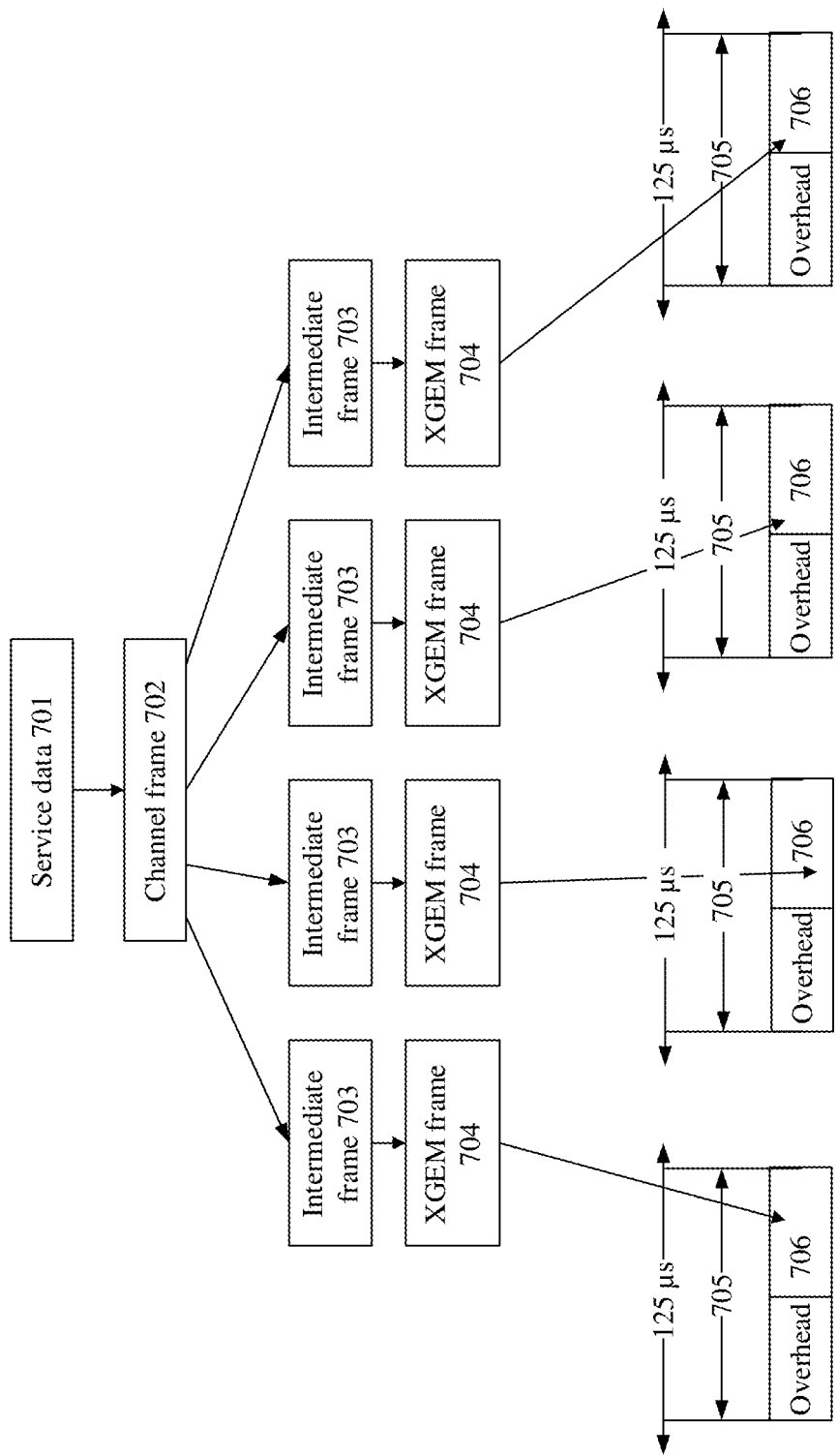
FIG. 7 is an example diagram of service data encapsulation.

FIG. 7 is an example diagram of service data encapsulation. The following first describes preconditions of this example:

Precondition a: An ONU sends a transmission frame in a slot specified by a convergence device, and a frame rate of the transmission frame is 8000 times per second.

Precondition b: A bandwidth of service data is 3 megabits per second (Mbps).

Precondition c: A second byte quantity corresponding to a channel frame is 192 bytes.

First, an ONU encapsulates service data 701 in a channel frame 702. For an execution process, refer to step 601 and step 602.

Next, the ONU may calculate a first byte quantity based on the precondition a and the precondition b. 3 Mbps=3072 kbps (kilobits per second)=3072000 bits (bits per second). If the first byte quantity is set to X, X*8000*8=3072000 bit/s. X=48 bytes can be derived.

Then, the ONU may determine a division parameter based on the first byte quantity and the precondition c. When the ONU determines that a second byte quantity used as a dividend=192 and the first byte quantity used as a divisor=48, the ONU determines that the second byte quantity/the first byte quantity=192/48=4. In this case, the ONU determines that the division parameter=4, so that the ONU can evenly divide the channel frame to form four intermediate frames 703. In addition, a byte quantity corresponding to each intermediate frame 703=192/4=48.

It can be learned that, in this example, if the second byte quantity used as the dividend can be exactly divided by the first byte quantity used as the divisor, the ONU can directly evenly divide the channel frame based on the division parameter.

The following example is described by using an example in which the second byte quantity used as the dividend cannot be exactly divided by the first byte quantity used as the divisor. The following first describes preconditions of this example:

Precondition a: An ONU sends a transmission frame in a slot specified by a convergence device, and a frame rate of the transmission frame is 8000 times per second.

Precondition b: A bandwidth of service data is 10 Mbps.

Precondition c: A second byte quantity corresponding to a channel frame is 350 bytes.

An ONU may calculate a first byte quantity based on the precondition a and the precondition b. When the first byte quantity is set to X, X*8000*8=10240000 bits. X=160 bytes can be derived.

Then, the ONU may determine a division parameter based on the first byte quantity and the precondition c. When the ONU determines that a second byte quantity used as a dividend=350 and the first byte quantity used as a divisor=160, the ONU determines the second byte quantity/the first byte quantity=350/160=2.18. In this case, the ONU determines that the division parameter=2, so that the ONU can evenly divide a channel frame to form two intermediate frames. In addition, a byte quantity corresponding to each intermediate frame=350/2=175.

In this example, if the second byte quantity used as the dividend cannot be exactly divided by the first byte quantity used as the divisor, the ONU can directly evenly divide the channel frame based on the division parameter.

Manner 2

In the foregoing manner 1, an example in which the channel frame is divided into the intermediate frames is used for description. In this manner, an example in which a plurality of channel frames is combined to form the intermediate frame is used for description.

In this manner, if a second byte quantity is less than or equal to the first byte quantity, the ONU combines a plurality of channel frames to form the intermediate frame. In this manner, a quantity of channel frames included in one intermediate frame is not limited, provided that a byte quantity corresponding to the intermediate frame is less than or equal to the first byte quantity. The following describes how the ONU combines the plurality of channel frames to form the intermediate frame.

First, the ONU may determine a combination frame quantity, where the combination frame quantity is a quotient between the first byte quantity used as a dividend and the second byte quantity used as a divisor.

Next, if the ONU determines that the channel frame meets a combination condition, the ONU combines channel frames whose quantity is the combination frame quantity, to form the intermediate frame. The combination condition is that the second byte quantity is less than or equal to the first byte quantity. The combination condition may further include that the combination frame quantity is a positive integer greater than 1.

Figure 8:
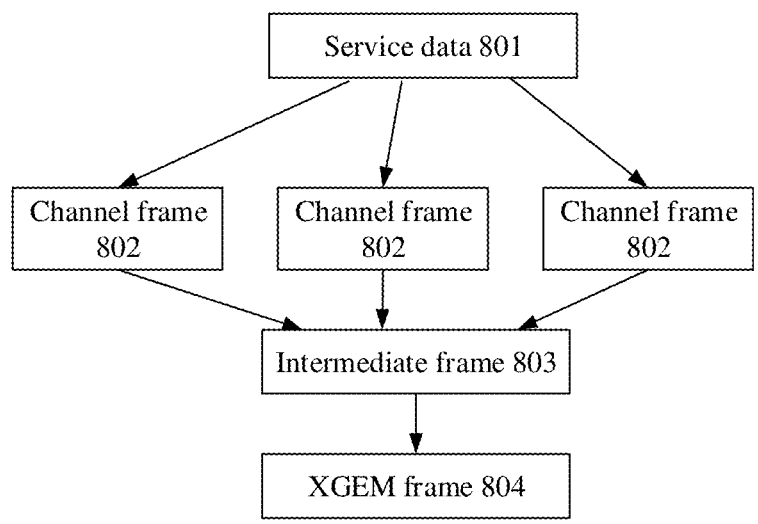
FIG. 8 is another example diagram of service data encapsulation.

For better understanding, the following provides descriptions with reference to an example. FIG. 8 is another example diagram of service data encapsulation. In this manner, for example, a second byte quantity corresponding to each channel frame 802 that carries service data 801 is 24. In an example in which an ONU determines that a first byte quantity is 72, the ONU can determine that a combination frame quantity is 72/24=3, so that the ONU can determine that the channel frame meets the combination condition, and therefore the ONU can combine three channel frames to form one intermediate frame 803. In this case, a byte quantity corresponding to the intermediate frame 803=24*3=72.

Step 604: The ONU encapsulates the intermediate frame in the payload area of the XGEM frame.

After the ONU obtains the intermediate frame, the ONU can encapsulate the intermediate frame in the payload area of the XGEM frame.

In this embodiment, an example in which the intermediate frame is encapsulated in the payload area of the XGEM frame is used for example description. In another optional example, the ONU may directly encapsulate the channel frame in the payload area of the XGEM frame without processing the channel frame.

When determining that the channel frame meets a direct encapsulation condition, the ONU can directly encapsulate the channel frame in the payload area of the XGEM frame. The direct encapsulation condition is that a second byte quantity is less than or equal to the first byte quantity. The direct encapsulation condition may further include that a combination frame quantity is equal to 1. For descriptions of the combination frame quantity, refer to step 603. Details are not described again. For example, if the second byte quantity corresponding to the channel frame is 192, and the first byte quantity is 200, the ONU can directly encapsulate the channel frame in the payload area of the XGEM frame.

Step 605: The ONU encapsulates the XGEM frame in a transmission frame.

In this embodiment, the transmission frame is an XGTC frame. The ONU may encapsulate the XGEM frame in a payload area of the XGTC frame. For better understanding, the following still uses those shown in FIG. 7 as an example for description.

As shown in FIG. 7, because a frame rate of a transmission frame shown in this embodiment is 8000 times per second, a slot occupied by each transmission frame is 125 microseconds (μs). The ONU can encapsulate an XGEM frame 704 in a payload area of an XGTC frame 705.

Step 606: The ONU sends the transmission frame to a convergence device.

Step 607: The convergence device receives the transmission frame from the ONU.

For descriptions of step 606 and step 607, refer to the related descriptions of step 305 and step 306 that are shown in FIG. 3. Details are not described herein again.

Step 608: The convergence device obtains the channel frame carried in the transmission frame.

First, when receiving the transmission frame, the convergence device can extract the XGEM frame from a payload area of the transmission frame.

Next, the convergence device extracts the intermediate frame from the payload area of the XGEM frame. After obtaining the XGEM frame, the convergence device can obtain indication information carried in an overhead of the XGEM frame, so that the convergence device can determine, based on the indication information, that data carried in the payload area of the XGEM frame is the intermediate frame.

Then, the convergence device processes the intermediate frame to form the channel frame. The convergence device may execute an inverse process of step 603 shown in FIG. 6, to implement a process of obtaining the channel frame based on the intermediate frame. For better understanding, the following describes, with reference to step 603, a process of obtaining the channel frame based on the intermediate frame.

Manner 1

If the ONU divides the channel frame to form the plurality of intermediate frames (for details, refer to the manner 1 shown in step 603), the convergence device may combine a plurality of intermediate frames that carry a same service into a channel frame in a framing manner.

The example shown in FIG. 7 is still used. When the convergence device receives four XGTC frames 705 shown in FIG. 7, the convergence device may decapsulate the four XGTC frames 705 to obtain XGEM frames 704. The convergence device determines, based on indication information included in overheads of the XGEM frames 704, that data carried in the XGEM frames 704 is intermediate frames. The convergence device determines, based on the overheads of the XGEM frames 704, intermediate frames that carry same service data, that is, four intermediate frames 703 shown in FIG. 7, so that the convergence device can combine the four intermediate frames 703 in a service data encapsulation sequence, to form a channel frame.

Manner 2

If the ONU combines the plurality of channel frames to form the intermediate frame (for details, refer to the manner 2 shown in step 603), in this case, the intermediate frame carries the plurality of channel frames. The convergence device may divide the intermediate frame to form the plurality of channel frames.

The example shown in FIG. 8 is still used. When the convergence device obtains an XGEM frame 804 from an XGTC frame, the convergence device determines, based on an overhead of the XGEM frame 804, that data carried in the XGEM frame 804 is an intermediate frame. The convergence device determines, based on the overhead of the XGEM frame, a plurality of channel frames included in the intermediate frame 803, so that the convergence device can divide the intermediate frame 803 to form three channel frames 802 shown in FIG. 8.

Step 609: The convergence device sends the channel frame to an OTN device.

For an execution process of step 609, refer to step 308 shown in FIG. 3. Details are not described herein again.

In this embodiment, when a frame rate of the XGEM frame does not match a frame rate of the channel frame, and the second byte quantity corresponding to the channel frame is fixed, the ONU can process the channel frame to form the intermediate frame, so that the ONU can successfully encapsulate the intermediate frame in the payload area of the XGEM frame, thereby improving a success rate of encapsulating the channel frame in the payload area of the XGEM frame, and avoiding a packet loss in the channel frame. This effectively reduces a latency in encapsulating the channel frame in the XGEM frame.

In the embodiment shown in FIG. 6, how to transmit, from an access network to an optical transport network, channel frames that carry same service data is used as an example for description. The following describes, with reference to FIG. 9, how to transmit, from an access network to an optical transport network, channel frames that carry different service data.

A quantity of pieces of service data transmitted by an ONU to a convergence device is not limited in this embodiment. For better understanding, in this embodiment, an example in which the ONU transmits two pieces of service data to the convergence device is used for example description. If the ONU needs to transmit more than two pieces of service data to the convergence device, a person skilled in the art may obviously obtain a method, based on the method shown in this embodiment, without creative efforts. This is not described in this embodiment in detail.

Step 901: The ONU receives first service data and second service data.

Service types of the first service data and the second service data are not limited in this embodiment. For example, a service type of the first service data is a video on-live service, and a service type of the second service data is a video on demand service.

Step 902: The ONU encapsulates the first service data in a first channel frame.

Step 903: The ONU encapsulates the second service data in a second channel frame.

For processes shown in step 902 and step 903, refer to the process, of encapsulating the service data in the channel frame, shown in the foregoing method embodiments. Details are not described herein again. There is no execution time sequence limitation between step 902 and step 903.

Step 904: The ONU processes the first channel frame to form a first intermediate frame.

Step 905: The ONU processes the second channel frame to form a second intermediate frame.

For processes shown in step 904 and step 905, refer to the process, of processing the channel frame to form the intermediate frame, shown in the foregoing method embodiments. Details are not described herein again. The formed first intermediate frame is used to carry the first service data, and the formed second intermediate frame is used to carry the second service data. There is no execution time sequence limitation between step 904 and step 905.

Step 906: The ONU obtains a first service slice that belongs to the first intermediate frame.

Step 907: The ONU obtains a second service slice that belongs to the second intermediate frame.

The ONU shown in this embodiment needs to separately extract at least some bytes from the first intermediate frame to form the first service slice. The ONU further needs to extract at least some bytes from the second intermediate frame to form the second service slice. For better understanding, the following describes a manner in which the ONU obtains the first service slice and the second service slice.

First, the ONU determines a target bandwidth ratio. The target bandwidth ratio is a ratio between a bandwidth occupied by the first service data and a bandwidth occupied by the second service data. For example, if the bandwidth occupied by the first service data is 5 Mbps, and the bandwidth occupied by the second service data is 4 Mbps, the ONU can determine that the target bandwidth ratio is 5/4.

Next, the ONU extracts the first service slice and the second service slice based on the target bandwidth ratio. A ratio between a quantity of bytes included in the first service slice and a quantity of bytes included in the second slice is equal to the target bandwidth ratio.

Still referring to the foregoing example, that is, the example in which the target bandwidth ratio is 5/4, the ONU may extract 5 bytes from the first intermediate frame to form the first service slice, and the ONU may further extract 4 bytes from the second intermediate frame to form the second service slice. It can be learned that the ONU only needs to separately extract the first service slice from the first intermediate frame and the second service slice from the second intermediate frame based on an integer multiple of the target bandwidth ratio.

Step 908: The ONU encapsulates the first service slice and the second service slice in a payload area of an XGEM frame in an interleaving manner.

Figure 10:
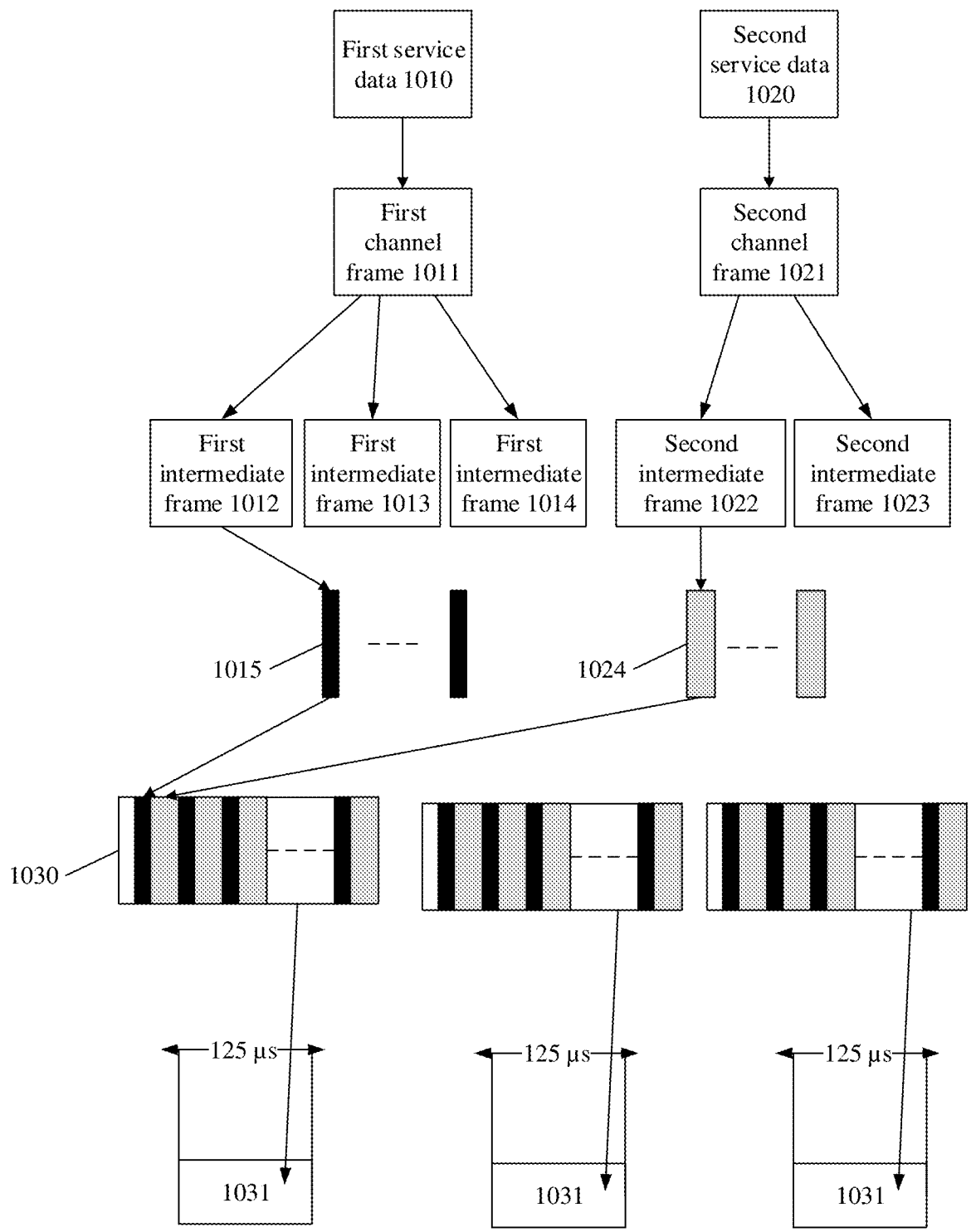
FIG. 10 is another example diagram of service data encapsulation.

To better understand the method shown in this embodiment, the following describes the method with reference to FIG. 10. In this example, a service bandwidth occupied by first service data 1010 is 4 Mbps, and a service bandwidth occupied by second service data 1020 is 6 Mbps.

As shown in FIG. 10, the ONU forms first intermediate frames for a first channel frame 1011, for example, a first intermediate frame 1012, a first intermediate frame 1013, and a first intermediate frame 1014 that are shown in FIG. 10. The ONU forms second intermediate frames for a second channel frame 1021, for example, a second intermediate frame 1022 and a second intermediate frame 1023 that are shown in FIG. 10.

The ONU may determine, based on the service bandwidth occupied by the first service data 1010 and the service bandwidth occupied by the second service data 1020, that a target bandwidth ratio=4/6=2/3.

The ONU may extract 2 bytes from the first intermediate frame 1012 to form a first service slice 1015. The ONU may further extract 3 bytes from the second intermediate frame 1022 to form a second service slice 1024.

Therefore, the ONU can encapsulate the first service slice 1015 and the second service slice 1024 in a payload area of an XGEM frame 1030. The process is performed through polling until the first service data 1010 and the second service data 1020 are completely encapsulated in the XGEM frame.

Step 909: The ONU encapsulates the XGEM frame in a transmission frame.

Still as shown in FIG. 10, the ONU may encapsulate the XGEM frame in a transmission frame 1031. For a process, refer to step 605 shown in FIG. 6. Details are not described again.

Step 910: The ONU sends the transmission frame to the convergence device.

Step 911: The convergence device receives the transmission frame from the ONU.

For execution processes of step 910 and step 911 that are shown in this embodiment, refer to step 606 and step 607 that are shown in FIG. 6. The execution processes are not described again.

Step 912: The convergence device obtains the first channel frame and the second channel frame that are carried in the transmission frame.

First, when receiving the transmission frame, the convergence device can extract the XGEM frame from a payload area of the transmission frame.

Next, the convergence device extracts the first service slice and the second service slice from the payload area of the XGEM frame. After obtaining the XGEM frame, the convergence device can obtain indication information carried in an overhead of the XGEM frame, so that the convergence device can determine, based on the indication information, that data carried in the payload area of the XGEM frame is the first service slice and the second service slice.

Then, the convergence device combines all obtained first service slices to form the first intermediate frame. The convergence device may further combine all obtained second service slices to form the second intermediate frame.

When the convergence device receives the first service slice and the second service slice, the convergence device may perform intermediate frame combination based on a quantity of bytes included in each service slice. The foregoing example is still used. The convergence device may determine that first service slices each having 2 bytes come from a same first intermediate frame, and second service slices each having 3 bytes come from a same second intermediate frame.

Then, the convergence device processes the first intermediate frame to form the first channel frame. The convergence device may further process the second intermediate frame to form the second channel frame. For a process, refer to step 608 shown in FIG. 6. Details are not described again.

Step 913: The convergence device sends the channel frames to an OTN device.

For an execution process of step 913 shown in this embodiment, refer to step 609 shown in FIG. 6. Details are not described again.

A plurality of hard pipelines may be disposed in the ONU shown in this embodiment. Each hard pipeline is configured to encapsulate one piece of service data in a channel frame. A transmission manner of the channel frame is a non-decapsulation manner between an optical transport network and an access network. Because the ONU shown in this embodiment needs to transmit a plurality of pieces of service data, the plurality of pieces of service data may be transmitted by using different hard pipelines.

In this embodiment, an example in which the ONU allocates a bandwidth by considering all hard pipelines as a whole is used for description. That the ONU allocates a bandwidth by considering all hard pipelines as a whole indicates that the ONU encapsulates, in a payload area of a same XGEM frame in an interleaving manner by considering all channel frames that carry different service data as a whole, all the channel frames that carry the different service data.

Optionally, in another example, the ONU may separately allocate bandwidths to hard pipelines. That is, the ONU encapsulates, in payload areas of different XGEM frames, channel frames that carry different service data.

In the method shown in this embodiment, the ONU allocates a bandwidth by considering all hard pipelines as a whole, so that a transmission latency and jitter in service data transmission are reduced, utilization of a bandwidth allocated to the ONU is effectively improved, and complexity of dynamic bandwidth allocation (DBA) in a service data transmission process can be effectively reduced.

Figure 11:
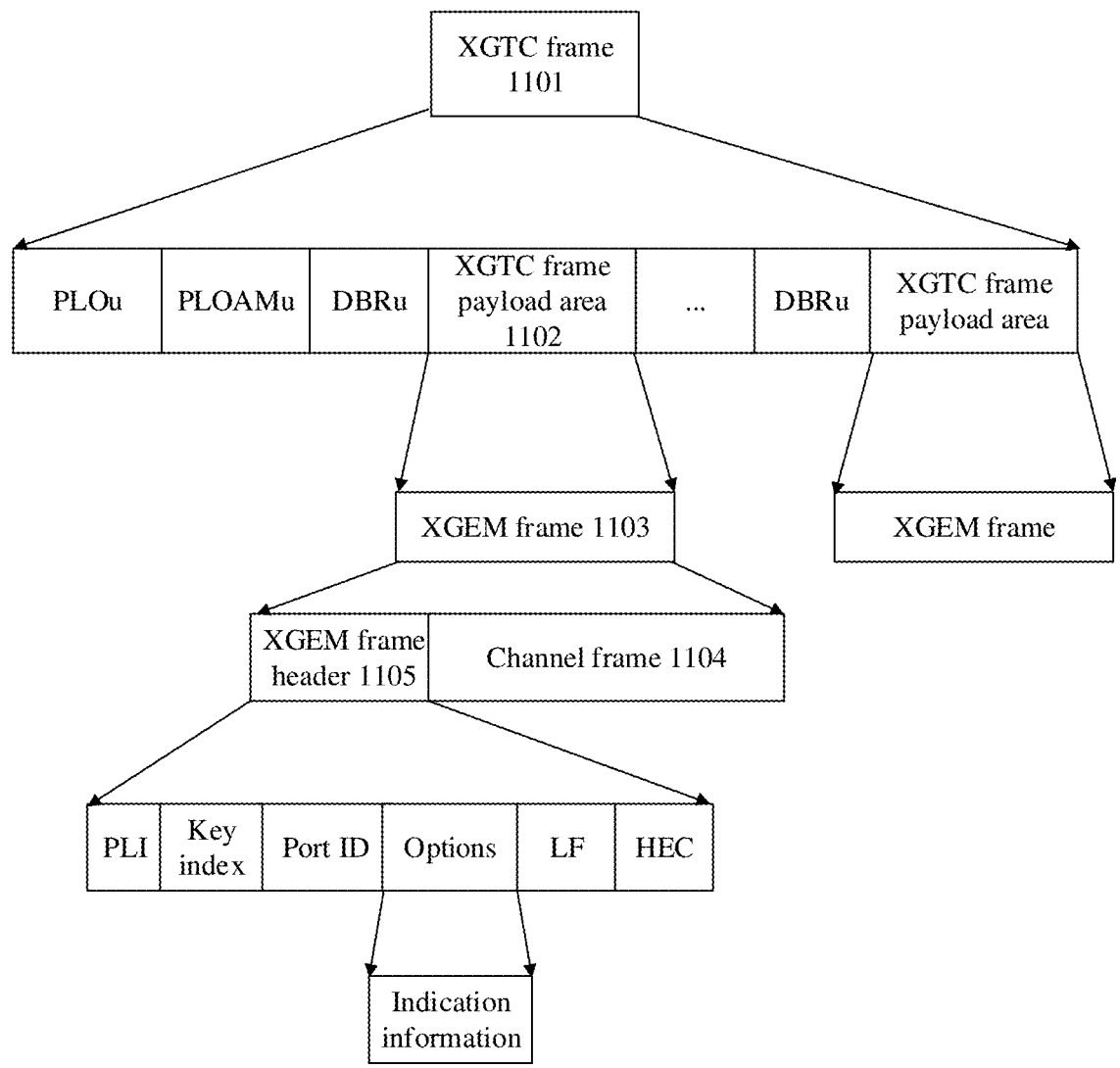
FIG. 11 is an example diagram of a frame structure of an XGTC frame.

The following describes, with reference to FIG. 11, a frame format of a transmission frame used to transmit service data from an access network to an optical transport network. In this embodiment, an example in which the access network is an XGPON is used for example description.

As shown in FIG. 11, an upstream overhead of an XGTC frame 1101 may include physical layer overhead upstream (PLOu), physical layer operation, administration, physical layer OAM upstream (PLOAMu), dynamic bandwidth report upstream (DBRu), and the like.

An XGEM frame 1103 is carried in an XGTC frame payload area 1102 of the XGTC frame 1101. A quantity of XGEM frames carried in the XGTC frame payload area 1102 is not limited in this embodiment, that is, the XGTC frame payload area 1102 may carry a plurality of XGEM frames.

A payload area of the XGEM frame shown in this embodiment carries a channel frame 1104. In FIG. 11, an example in which the payload area of the XGEM frame 1103 carries the channel frame 1104 is used for example description. In the foregoing method embodiments, the ONU may alternatively process the channel frame to form an intermediate frame. In this example, the payload area of the XGEM frame 1103 carries the intermediate frame. For descriptions, refer to the foregoing method embodiments. Details are not described again.

An XGEM frame header 1105 shown in this embodiment includes a payload length indicator (PLI) field, a Port ID field used to support multi-port multiplexing, a key index field, a last fragment (LF) field, and a header error check (HEC) field.

In this embodiment, the XGEM frame header 1105 further includes a reserved options field. The options field is used to carry indication information, and the indication information is used to indicate the channel frame. For descriptions of the indication information, refer to the foregoing method embodiments. Details are not described again.

Figure 12:
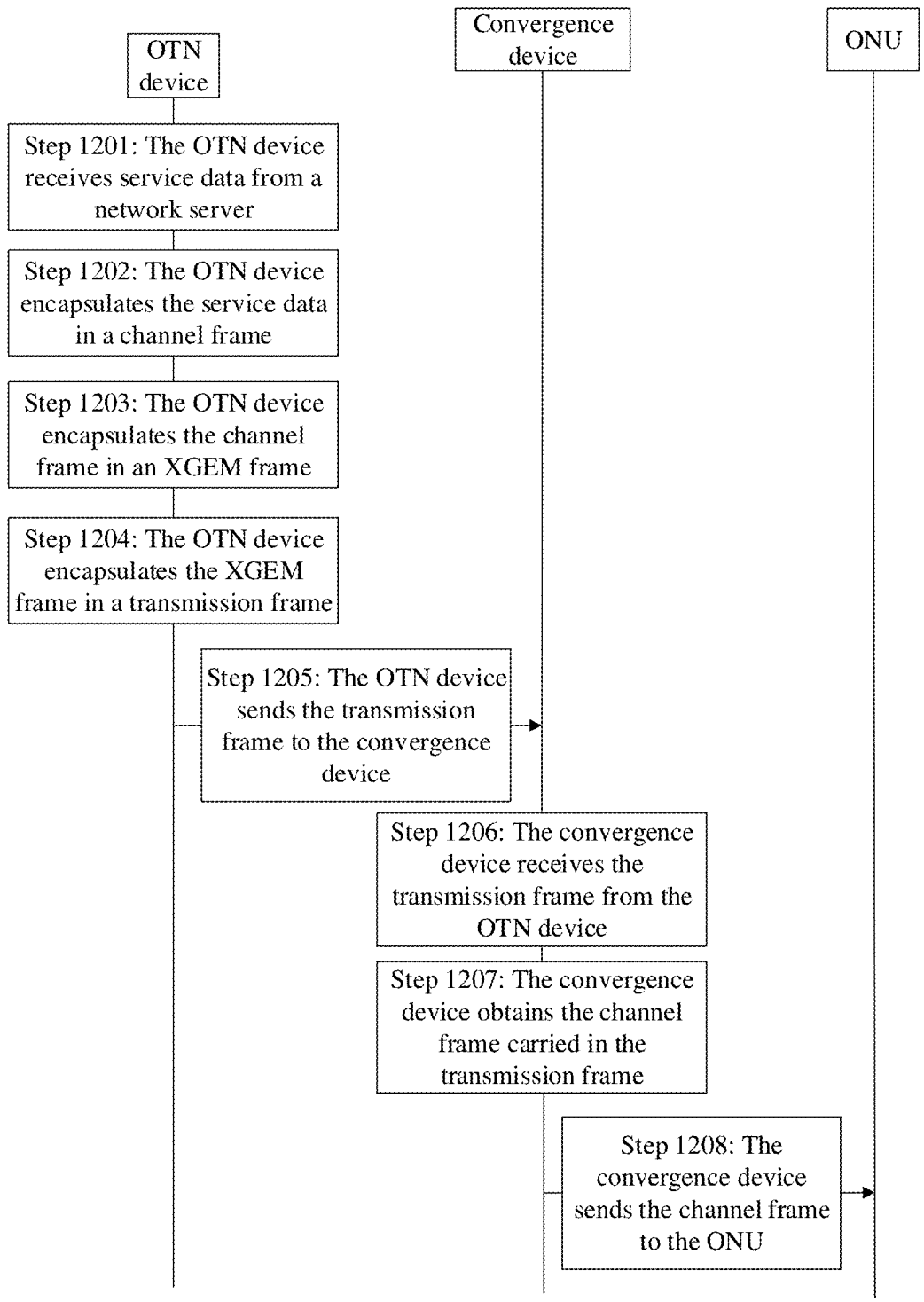
FIG. 12 is a step flowchart of another embodiment of a service data transmission method.

The foregoing embodiments describe transmission of service data in an upstream transmission direction, and the following describes transmission of service data in a downstream transmission direction with reference to FIG. 12.

Step 1201: An OTN device receives service data from a network server.

As shown in FIG. 4, the OTN device receives the service data from the network server by using a service network interface. For descriptions of the network server, refer to that shown in FIG. 1. Details are not described again.

Step 1202: The OTN device encapsulates the service data in a channel frame.

For a process in which the OTN device encapsulates the service data in the channel frame, refer to the descriptions (such as step 302 in FIG. 3 and step 602 in FIG. 6), of encapsulating, by the ONU, the service data in the channel frame, shown in the foregoing method embodiments. Details are not described herein again.

As shown in FIG. 4, an OTN-side channel layer 415 may be added to the OTN device. The OTN-side channel layer 415 is configured to: determine a byte quantity corresponding to the channel frame and encapsulate the service data in the channel frame. For descriptions of the OTN-side channel layer 415, refer to the descriptions of the ONU-side channel layer 402 in the embodiment shown in FIG. 3. Details are not described again.

Step 1203: The OTN device encapsulates the channel frame in an XGEM frame.

Figure 9:
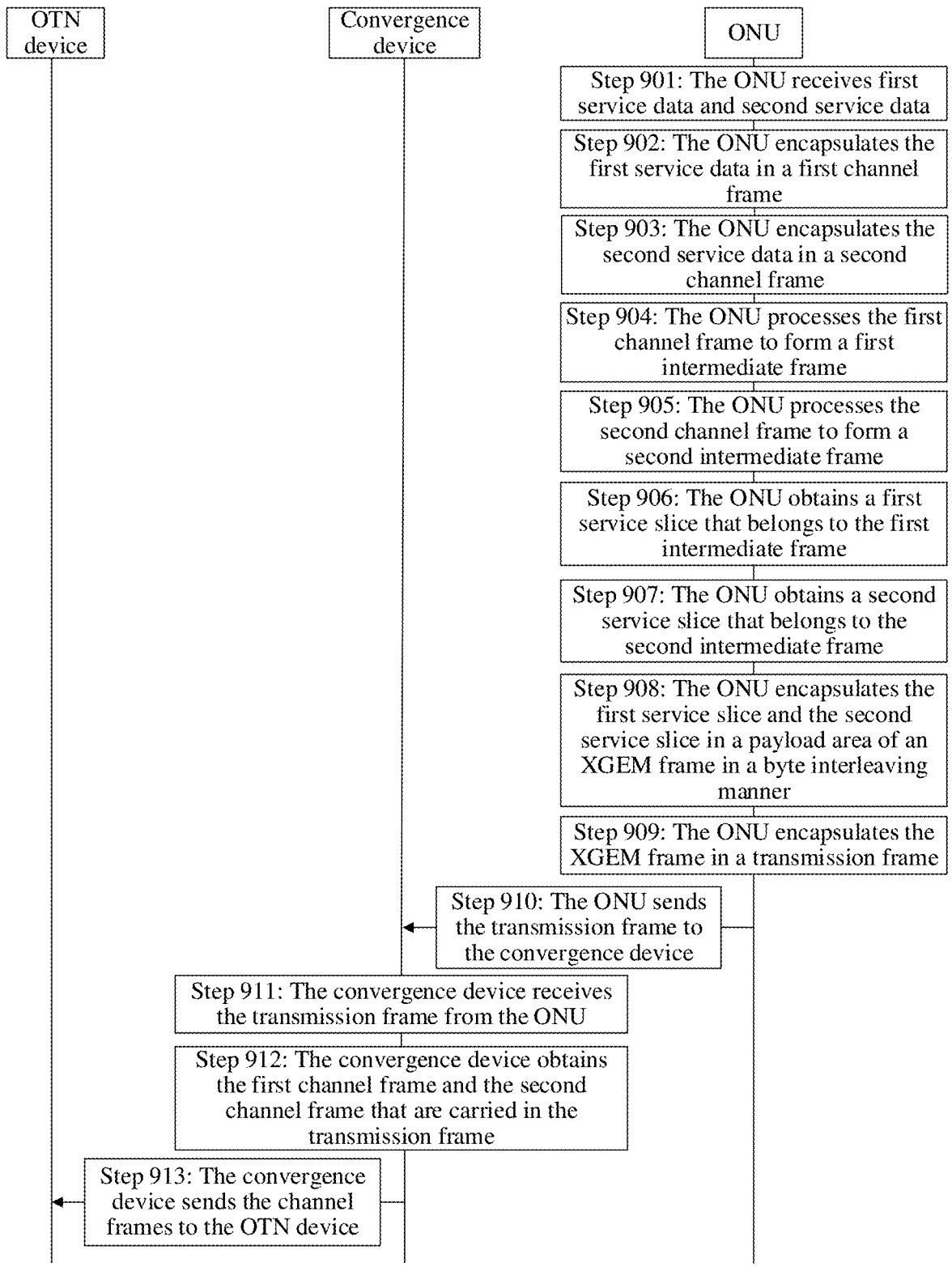
FIG. 9 is a step flowchart of another embodiment of a service data transmission method.

For an execution process of step 1203 shown in this embodiment, refer to the process, in which the ONU encapsulates the channel frame in the XGEM frame, in the foregoing method embodiments, such as step 303 shown in FIG. 3, step 603 and step 604 that are shown in FIG. 6, and step 904 to step 908 that are shown in FIG. 9.

Step 1204: The OTN device encapsulates the XGEM frame in a transmission frame.

Step 1205: The OTN device sends the transmission frame to a convergence device.

Step 1206: The convergence device receives the transmission frame from the OTN device.

Step 1207: The convergence device obtains the channel frame carried in the transmission frame.

Step 1208: The convergence device sends the channel frame to an ONU.

For execution processes of step 1204 to step 1208 that are shown in this embodiment, refer to step 304 to step 308 that are shown in FIG. 3, refer to step 605 to step 609 that are shown in FIG. 6, or refer to step 909 to step 913 that are shown in FIG. 9. Details are not described again.

An ONU-side channel layer 402 of the ONU is configured to obtain the service data by de-capsulating the channel frame. The ONU-side channel layer 402 is further configured to send the obtained service data to a corresponding user-side device.

A difference between the transmission frame, in the downstream transmission direction, shown in this embodiment and the transmission frame, in the upstream transmission direction, shown in the foregoing method embodiments lies in that the transmission frame in the upstream transmission direction is transmitted in a burst manner, and the transmission frame in the downstream transmission direction is transmitted in a continuous manner. For descriptions of a frame format of the transmission frame shown in this embodiment, refer to those shown in FIG. 11. Details are not described again.

For descriptions of beneficial effects of the method shown in this embodiment, refer to those shown in the foregoing method embodiments. Details are not described in this embodiment again.

Figure 13:
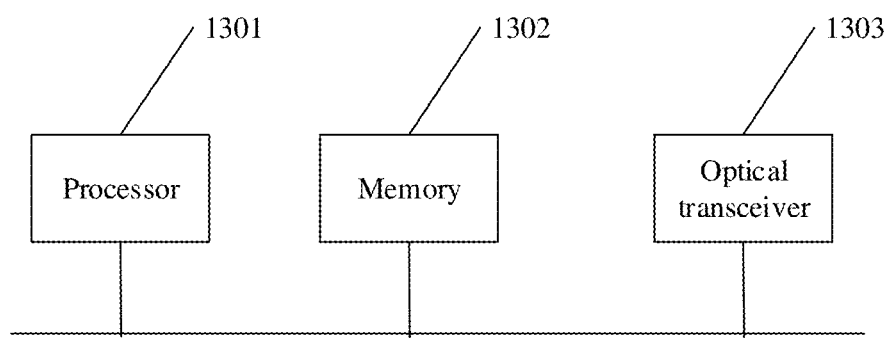
FIG. 13 is an example diagram of a structure of a first device or a second device.

The following describes, with reference to FIG. 13, a first device and a second device. In transmission of service data in an upstream transmission direction, the first device is the ONU in the foregoing embodiments, and the second device is a convergence device. In transmission of service data in a downstream transmission direction, the first device is the convergence device in the foregoing embodiments, and the second device is an ONU. The following describes structures of the first device and the second device with reference to different transmission directions of service data.

In upstream transmission of service data:

In a possible implementation, FIG. 13 may be a schematic diagram of a structure of a first device. The first device includes a processor 1301, a memory 1302, and an optical transceiver 1303. The processor 1301, the memory 1302, and the optical transceiver 1303 are interconnected by using a line. The memory 1302 is configured to store program instructions and data.

In a possible implementation, the memory 1302 stores program instructions and data that support the steps performed by the ONU in the steps shown in FIG. 3, FIG. 6, and FIG. 9, and the processor 1301 and the optical transceiver 1303 are configured to perform the method steps, performed by the ONU, shown in any one of the embodiments shown in FIG. 3, FIG. 6, and FIG. 9.

In FIG. 13, the optical transceiver 1303 is configured to perform step 301 and step 305, and the processor 1301 is configured to perform step 302 to step 304. In FIG. 6, the optical transceiver 1303 is configured to perform step 601 and step 606, and the processor 1301 is configured to perform step 602 to step 605. In FIG. 9, the optical transceiver 1303 is configured to perform step 901 and step 910, and the processor 1301 is configured to perform step 902 to step 909.

In another possible implementation, FIG. 13 may be alternatively an example diagram of a structure of a second device. Therefore, in this implementation, a memory 1302 stores program instructions and data that support the steps performed by the convergence device in the steps shown in FIG. 3, FIG. 6, and FIG. 9, and a processor 1301 and an optical transceiver 1303 are configured to perform the method steps, performed by the convergence device, shown in any one of the embodiments shown in FIG. 3, FIG. 6, and FIG. 9.

In FIG. 3, the optical transceiver 1303 is configured to perform step 306 and step 308, and the processor 1301 is configured to perform 307. In FIG. 6, the optical transceiver 1303 is configured to perform step 607 and step 609, and the processor 1301 is configured to perform 608. In FIG. 9, the optical transceiver 1303 is configured to perform step 911 and step 913, and the processor 1301 is configured to perform 912.

In downstream transmission of service data:

In a possible implementation, FIG. 13 may be a schematic diagram of a structure of a first device. A memory 1302 shown in FIG. 13 stores program instructions and data that support the steps performed by the convergence device in the steps shown in FIG. 12, and a processor 1301 and an optical transceiver 1303 are configured to perform the method steps, performed by the convergence device, shown in FIG. 12. In FIG. 12, the optical transceiver 1303 is configured to perform step 1206 and step 1208, and the processor 1301 is configured to perform 1207.

In another possible implementation, FIG. 13 may be alternatively an example diagram of a structure of a second device. A memory 1302 shown in FIG. 13 stores program instructions and data that support the steps performed by the ONU in the steps shown in FIG. 12, and a processor 1301 and an optical transceiver 1303 are configured to perform the method steps, performed by the ONU, shown in FIG. 12. For descriptions of the method steps performed by the ONU, refer to those shown in FIG. 12. Details are not described again.

An embodiment further provides a digital processing chip. A circuit and one or more interfaces that are configured to implement functions of the foregoing processor 1301 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through an interface. The digital processing chip implements, based on program code stored in the external memory, the actions performed by the ONU or the convergence device in the foregoing embodiments.

A person of ordinary skill in the art may understand that all or some of the steps of the embodiments may be implemented by a program instructing related hardware. The program may be stored in a computer-readable storage medium. The foregoing storage medium may be a read-only memory, a random access memory, or the like. For example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraint conditions of the solutions. A person skilled in the art may use different methods to implement the described functions for each particular application, but it should not be considered that the implementation goes beyond the scope.

When software is used to implement the embodiments, the method steps in the foregoing embodiments may be implemented completely or partially in a form of a computer program product. The computer program product includes one or more computer instructions. When the computer program instructions are loaded and executed on a computer, the procedures or functions according to the embodiments are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium.

Finally, it should be noted that, the foregoing descriptions are merely implementations, but are not intended to limit the scope of the embodiments. Any variation or replacement readily figured out by a person skilled in the art shall be envisioned to be within the scope of the embodiments.

What is claimed is:

1. A service data transmission method comprising:
    encapsulating, by a first device, a channel frame in a transmission frame, wherein the channel frame is used to carry service data, the channel frame is transmitted between an optical transport network and an access network in a non-decapsulation transmission manner, and the transmission frame comprises indication information used to indicate the channel frame; and
    sending, by the first device, the transmission frame to a second device.

2. The service data transmission method according to claim 1, wherein before the encapsulating, by the first device, the channel frame in the transmission frame, the method further comprises:
    processing, by the first device, the channel frame to form an intermediate frame, wherein a byte quantity corresponding to the intermediate frame is less than or equal to a first byte quantity, and the first byte quantity is a byte quantity corresponding to a payload area of a 10-gigabit-capable passive optical network encapsulation method (XGEM) frame.

3. The service data transmission method according to claim 2, wherein processing, by the first device, the channel frame to form the intermediate frame further comprises:
    when a second byte quantity is greater than the first byte quantity, dividing, by the first device, the channel frame to form a plurality of intermediate frames, wherein the second byte quantity is a byte quantity corresponding to the channel frame.

4. The service data transmission method according to claim 3, wherein dividing, by the first device, the channel frame to form the plurality of intermediate frames further comprises:
    obtaining, by the first device, a division parameter, wherein the division parameter is a quotient between the second byte quantity used as a dividend and the first byte quantity used as a divisor; and
    evenly dividing, by the first device, the channel frame based on the division parameter, to form the intermediate frames, wherein a quantity of intermediate frames is equal to the division parameter.

5. The service data transmission method according to claim 2, wherein processing, by the first device, the channel frame to form the intermediate frame further comprises:
when a second byte quantity is less than or equal to the first byte quantity, combining, by the first device, a plurality of channel frames to form the intermediate frame, wherein the second byte quantity is a byte quantity corresponding to the channel frame.

6. The service data transmission method according to claim 5, wherein a quotient between the first byte quantity used as a dividend and the second byte quantity used as a divisor is a positive integer greater than 1.

7. The service data transmission method according to claim 2, wherein encapsulating, by the first device, the channel frame in the transmission frame further comprises:
encapsulating, by the first device, the intermediate frame in the payload area of the XGEM frame; and
encapsulating, by the first device, the XGEM frame in the transmission frame, wherein the transmission frame is a 10-gigabit-capable passive optical network transmission convergence (XGTC) frame.

8. The service data transmission method according to claim 2, wherein a first intermediate frame is used to carry first service data, a second intermediate frame is used to carry second service data, and the encapsulating, by the first device, the channel frame in the transmission frame further comprises:
encapsulating, by the first device, a first service slice and a second service slice in the payload area of the XGEM frame in an interleaving manner, wherein an overhead of the XGEM frame carries the indication information, the first service slice belongs to the first intermediate frame, the second service slice belongs to the second intermediate frame, and a ratio between a quantity of bytes comprised in the first service slice and a quantity of bytes comprised in the second service slice is equal to a bandwidth ratio between the first service data and the second service data; and
encapsulating, by the first device, the XGEM frame in the transmission frame, wherein the transmission frame is an XGTC frame.

9. The service data transmission method according to claim 1, wherein encapsulating, by the first device, the channel frame in the transmission frame further comprises:
when a second byte quantity is less than or equal to a first byte quantity, encapsulating, by the first device, the channel frame in a payload area of an XGEM frame, wherein the second byte quantity is a byte quantity corresponding to the channel frame, and the first byte quantity is a byte quantity corresponding to the payload area of the XGEM frame; and
encapsulating, by the first device, the XGEM frame in the transmission frame, wherein the transmission frame is an XGTC frame.

10. The service data transmission method according to claim 9, wherein a quotient between the first byte quantity used as a dividend and the second byte quantity used as a divisor is 1.

11. A service data transmission method comprising:
receiving, by a second device, a transmission frame from a first device, wherein the transmission frame comprises indication information used to indicate a channel frame; and
obtaining, by the second device, the channel frame carried in the transmission frame, wherein the channel frame is used to carry service data, and the channel frame is transmitted between an optical transport network and an access network in a non-decapsulation manner.

12. The service data transmission method according to claim 11, wherein obtaining, by the second device, the channel frame carried in the transmission frame further comprises:
obtaining, by the second device, an intermediate frame carried in the transmission frame, wherein a byte quantity corresponding to the intermediate frame is less than or equal to a first byte quantity, and the first byte quantity is a byte quantity corresponding to a payload area of an XGEM frame; and
processing, by the second device, the intermediate frame to obtain the channel frame.

13. The service data transmission method according to claim 12, wherein obtaining, by the second device, the intermediate frame carried in the transmission frame further comprises:
obtaining, by the second device, the XGEM frame carried in the transmission frame, wherein the transmission frame is an XGTC frame, and an overhead of the XGEM frame carries the indication information;
obtaining, by the second device, a first service slice and a second service slice from the XGEM frame, wherein the first service slice belongs to a first intermediate frame, the second service slice belongs to a second intermediate frame, the first intermediate frame is used to carry first service data, the second intermediate frame is used to carry second service data, and a ratio between a quantity of bytes comprised in the first service slice and a quantity of bytes comprised in the second service slice is equal to a bandwidth ratio between the first service data and the second service data;
obtaining, by the second device, the first intermediate frame based on the first service slice; and
obtaining, by the second device, the second intermediate frame based on the second service slice.

14. A digital processing chip comprising a processor and a memory that are interconnected by a line, wherein the memory is configured to stores instructions, and the processor is configured to perform a service data transmission method:
encapsulating a channel frame in a transmission frame, wherein the channel frame is used to carry service data, the channel frame is transmitted between an optical transport network and an access network in a non-decapsulation transmission manner, and the transmission frame comprises indication information used to indicate the channel frame; and
sending the transmission frame to a second device.

15. The digital processing chip according to claim 14, wherein the processor is further configured to process
the channel frame to form an intermediate frame, wherein a byte quantity corresponding to the intermediate frame is less than or equal to a first byte quantity, and the first byte quantity is a byte quantity corresponding to a payload area of a 10-gigabit-capable passive optical network encapsulation method (XGEM) frame.

16. The digital processing chip according to claim 15, wherein processing the channel frame to form the intermediate frame further comprises:
when a second byte quantity is greater than the first byte quantity, dividing the channel frame to form a plurality of intermediate frames, wherein the second byte quantity is a byte quantity corresponding to the channel frame.

17. The digital processing chip according to claim 16, wherein dividing the channel frame to form a plurality of intermediate frames further comprises:
- obtaining a division parameter, wherein the division parameter is a quotient between the second byte quantity used as a dividend and the first byte quantity used as a divisor; and
- evenly dividing the channel frame based on the division parameter, to form the intermediate frames, wherein a quantity of intermediate frames is equal to the division parameter.

18. The digital processing chip according to claim 15, wherein processing the channel frame to form the intermediate frame further comprises:
- when a second byte quantity is less than or equal to the first byte quantity, combining a plurality of channel frames to form the intermediate frame, wherein the second byte quantity is a byte quantity corresponding to the channel frame.

19. The digital processing chip according to claim 18, wherein a quotient between the first byte quantity used as a dividend and the second byte quantity used as a divisor is a positive integer greater than 1.

20. The digital processing chip according to claim 15, wherein encapsulating the channel frame in the transmission frame further comprises:
- encapsulating the intermediate frame in the payload area of the XGEM frame; and
- encapsulating the XGEM frame in the transmission frame, wherein the transmission frame is a 10-gigabit-capable passive optical network transmission convergence (XGTC) frame.

\* \* \* \* \*